United States Patent
Egnor et al.

(10) Patent No.: US 10,710,565 B2
(45) Date of Patent: Jul. 14, 2020

(54) BRAKING CONTROL BEHAVIORS FOR AUTONOMOUS VEHICLES DURING HYDRAULIC SYSTEM FAILURE

(71) Applicant: Waymo LLC, Mountain View, CA (US)

(72) Inventors: Daniel Trawick Egnor, Palo Alto, CA (US); Nolan McPeek-Bechtold, Belmont, CA (US); James Harris, San Francisco, CA (US); Andrew Barton-Sweeney, Oakland, CA (US); Ruslan Kurdyumov, San Francisco, CA (US); Spencer Alexander, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 119 days.

(21) Appl. No.: 16/156,441

(22) Filed: Oct. 10, 2018

(65) Prior Publication Data

US 2020/0114889 A1    Apr. 16, 2020

(51) Int. Cl.
*B60T 8/94* (2006.01)
*B60T 7/12* (2006.01)
*B60T 8/32* (2006.01)
*B60T 8/17* (2006.01)
*B60T 8/1761* (2006.01)

(52) U.S. Cl.
CPC ......... *B60T 8/94* (2013.01); *B60T 7/12* (2013.01); *B60T 8/17* (2013.01); *B60T 8/17616* (2013.01); *B60T 8/326* (2013.01); *B60T 2270/10* (2013.01); *B60T 2270/403* (2013.01); *B60T 2270/404* (2013.01)

(58) Field of Classification Search
CPC ..... B60T 8/94; B60T 7/12; B60T 8/17; B60T 8/17616; B60T 8/326
See application file for complete search history.

(56) References Cited

U.S. PATENT DOCUMENTS

| | | | |
|---|---|---|---|
| 9,296,370 B2 | 3/2016 | McClain et al. | |
| 9,702,304 B1 | 7/2017 | Gaither et al. | |
| 9,776,607 B2 | 10/2017 | Brenn et al. | |
| 2016/0214595 A1 | 7/2016 | Baehrle-Miller et al. | |
| 2016/0271501 A1* | 9/2016 | Balsbaugh | A63F 13/828 |
| 2019/0168724 A1* | 6/2019 | VandenBerg, III | B60T 7/12 |
| 2019/0217834 A1* | 7/2019 | Maruo | B60T 8/4081 |
| 2019/0299951 A1* | 10/2019 | Spieker | B60T 13/662 |
| 2019/0344767 A1* | 11/2019 | Bareiss | B60T 13/745 |
| 2020/0070803 A1* | 3/2020 | Matoy | B60T 8/365 |

* cited by examiner

*Primary Examiner* — Hussein Elchanti
(74) *Attorney, Agent, or Firm* — Botos Churchill IP Law

(57) ABSTRACT

The disclosure relates to controlling braking behaviors a vehicle in an autonomous driving mode in the event of a hydraulic system failure. For instance, the vehicle may be controlled in the autonomous driving mode according to a first braking control behavior based on a first relationship between position of a brake pedal of the vehicle and amount of deceleration for the vehicle. While controlling the vehicle, a failure of a hydraulic system may be determined. Based on the determination, the vehicle may be controlled in the autonomous driving mode according to a second braking control behavior by moving the brake pedal until the vehicle reaches a deceleration target defined by the second braking control behavior.

20 Claims, 8 Drawing Sheets

(PRIOR ART)
100

BRAKING CONTROL BEHAVIORS FOR AUTONOMOUS VEHICLES DURING HYDRAULIC SYSTEM FAILURE

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location by controlling various systems of the vehicles, including acceleration and deceleration (braking) systems of the vehicle.

As shown in the example prior art hydraulic braking system 100 of FIG. 1, a typical vehicle may include a split hydraulic brake system that includes multiple hydraulic circuits. As shown, a pair of hydraulic circuits are connected through a hydraulic fluid reservoir 10. Each hydraulic circuit includes a first or second chamber 20, 22. First chamber 20 is defined by a pair of seals 30, 32, and second chamber 22 is defined by seal cylinder wall 46, respectively. Once the vehicle's brake pedal is depressed, this cause a push rod 40 (which may also include a spring, not shown) to force a plunger 42 towards a floating piston 38 which increases the pressure in the first chamber 20 and the second chamber 22. Eventually, with enough force, the seals 30, 34 are moved towards the cylinder wall 46 and eventually cut off the hydraulic fluid reservoir 10 from the first and second chambers 20, 22 causing a the floating piston 38 to move even further towards the cylinder wall 46. This, in turn, causes the floating piston to force the seal 34 towards the end wall 46. Pressure in the two chambers 20, 22 is equalized through the floating piston 38 and springs 46, 48. Spring 46 functions to separate the seals 30, 32, and spring 48 provides resistance between seal 34 and end wall 46. As shown, the inlet traces 31, 35 from the reservoir 10 to the chambers 20, 22 are be very close to the seals 30, 34 in order to ensure that at rest, fluid can flow from the chambers to the reservoir but as soon as the plunger 42 moves to the right, the seals 30, 34 slide towards the end wall 46 and close off the flow path to the reservoir. Each one of the circuits may control a pair of brakes, for instance, front and rear, via lines 50, 52.

FIG. 2 depicts a chart 200 with example braking profiles relating the percentage of braking (how much deceleration is effected) given the distance that the brake pedal is moved towards a maximum position or maximum depression level. As can be seen by the normal deceleration curve (when there is no hydraulic system failure), for the most part, between about 10% and about 90% distance, the movement of the brake pedal has a generally linear relationship with the amount of deceleration.

Returning to FIG. 1, in the case of a total loss of hydraulic pressure or a slow leak in the hydraulic system, the hydraulic braking system 100 may allow a human driver the ability to still be able to brake (i.e. slow a vehicle down). For instance, via a leak in the line 50 to the front brakes, pressure may drop in the first chamber 20. In this case, a "normal" braking force would not build enough pressure from the floating piston 38 against the seal 34 to cause the front or rear brakes to engage properly. A human driver may instinctively continue to push on the brake pedal until the rod builds up enough pressure to force the floating piston 38 to move the seal 34 towards the end wall. This would build up pressure in the second chamber 22 and cause the hydraulic fluid to move via line 52 towards the rear brakes, thereby slowing the vehicle down. Returning to FIG. 2, as can be seen by the front hydraulic failure curve (when there is a failure in the line 50), there is no braking power until the brake pedal has been moved almost 30% of the total distance possible. At this point, the shape of the curve is somewhat similar to that of the normal deceleration curve.

However, because the first piston 20 has to be moved some distance which is significantly greater than that required under "normal" non-failure circumstances, the brakes would feel much less responsive. In other words, the maximum amount of braking may be reduced, and a deceleration that may normally have required a very slight pedal push may require a significantly harder push and a much further depression of the brake pedal. A similar situation would occur in the event of a leak in the line 52 that goes to the rear brakes as can be seen from the rear hydraulic failure curve of FIG. 2. While a human driver may automatically respond by continuing to press harder on the brake pedal until the vehicle begins to slow down to a desired level, autonomous vehicles do not have such capabilities and as discussed further below, may encounter additional problems when such failures occur.

BRIEF SUMMARY

One aspect of the disclosure provides a method of controlling braking behaviors of a vehicle in an autonomous driving mode in response to a hydraulic system failure. The method includes controlling, by one or more processors, the vehicle in the autonomous driving mode according to a first braking control behavior based on a first relationship between position of a brake pedal and amount of deceleration of the vehicle; while controlling the vehicle, determining, by the one or more processors, that the vehicle has experienced a hydraulic system failure; and based on the determination, controlling, by the one or more processors, the vehicle in the autonomous driving mode according to a second braking control behavior by moving the brake pedal until the vehicle reaches a deceleration target defined by the second braking control behavior.

In one example, determining that the vehicle has experienced a hydraulic system failure includes determining both that the a difference between the vehicle's expected and actual deceleration meets a threshold value and that a deceleration system of the vehicle is in a brake pedal only control mode. In this example, determining that the deceleration system of the vehicle is in a brake pedal only control mode is based on an error message from an ABS of the vehicle indicating that the ABS is or will shut down. In addition or alternatively, determining that the deceleration system of the vehicle is in a brake pedal only control mode is based on an error message from an electronic stability control (ESC) system of the vehicle indicating that the ESC system is or will shut down. As another example, determining that the difference meets a threshold value is based on a current trajectory for the vehicle and a location of the vehicle relative to that trajectory. As another example, the second braking control behavior includes moving the brake pedal at a first predetermined rate. In this example, the method also includes while moving the brake pedal at the first predetermined rate, determining that a wheel of the vehicle is slipping and based on the determination that the wheel is slipping, adjusting the first predetermined rate to a second predetermined rate. In this example, the method also includes after adjusting the first predetermined rate to the second predetermined rate, determining that the wheel of the vehicle is no longer slipping and based on the determination that the wheel is no longer slipping, adjusting the second predetermined rate to the first predetermined rate until the deceleration target is reached. In addition or alternatively, the first predetermined rate includes increasing the position of the brake pedal towards a maximum depression level, and the second predetermined rate include decreasing of the brake pedal away from the maximum depression level. In addition or alternatively, an absolute value of the first predetermined rate is at least twice as fast as an absolute value of the second predetermined rate. In addition or alternatively, an absolute value of the second predetermined rate is at least half as fast as an absolute value of the first predetermined rate. In addition or alternatively, determining that the wheel is slipping is based on feedback from a wheel speed sensor of the wheel. In another example, the method also includes determining that a wheel speed sensor of a wheel of the vehicle has failed and based on the determination that the wheel speed sensor of the wheel has failed, reducing the deceleration target to a lower amount of deceleration. In another example, controlling the vehicle in the autonomous driving mode according to the second braking control behavior includes stopping the vehicle. In another example, controlling the vehicle in the autonomous driving mode according to the second braking control behavior includes stopping the vehicle once a destination of a passenger is reached. In another example, the hydraulic system failure corresponds to a leaking of hydraulic fluid over time. In another example, the hydraulic system failure corresponds to a total loss of hydraulic pressure.

Another aspect of the disclosure provides a system for controlling braking behaviors of a vehicle in an autonomous driving mode in response to a hydraulic system failure. The system includes one or more processors configured to control the vehicle in the autonomous driving mode according to a first braking control behavior based on a first relationship between position of a brake pedal and amount of deceleration of the vehicle; while controlling the vehicle, determine that the vehicle has experienced a hydraulic system failure; and based on the determination, control the vehicle in the autonomous driving mode according to a second braking control behavior by moving the brake pedal until the vehicle reaches a deceleration target defined by the second braking control behavior.

In one example, the one or more processors are configured to determine that the vehicle has experienced a hydraulic system failure by determining both that a difference between the vehicle's expected deceleration and actual deceleration meets a threshold value and that a deceleration system of the vehicle is in a brake pedal only control mode. In another example, the system also includes the vehicle.

DETAILED DESCRIPTION

Overview

The technology relates to allowing a vehicle in an autonomous driving mode to adapt its braking control behaviors during a hydraulic system failure. As an example, a failure may be a total loss of hydraulic pressure or a slow leak that reduces pressure over time. Autonomous vehicles may encounter additional problems when such failures occur. Typically, there is a fixed relationship between brake pedal position and braking power and the vehicle's computing devices use this information, as well as feedback from the vehicle's antilock braking system (ABS) or electronic stability control (ESC) system. However, in the event of a hydraulic system failure, the fixed relationship would no longer be correct.

Figure 2:
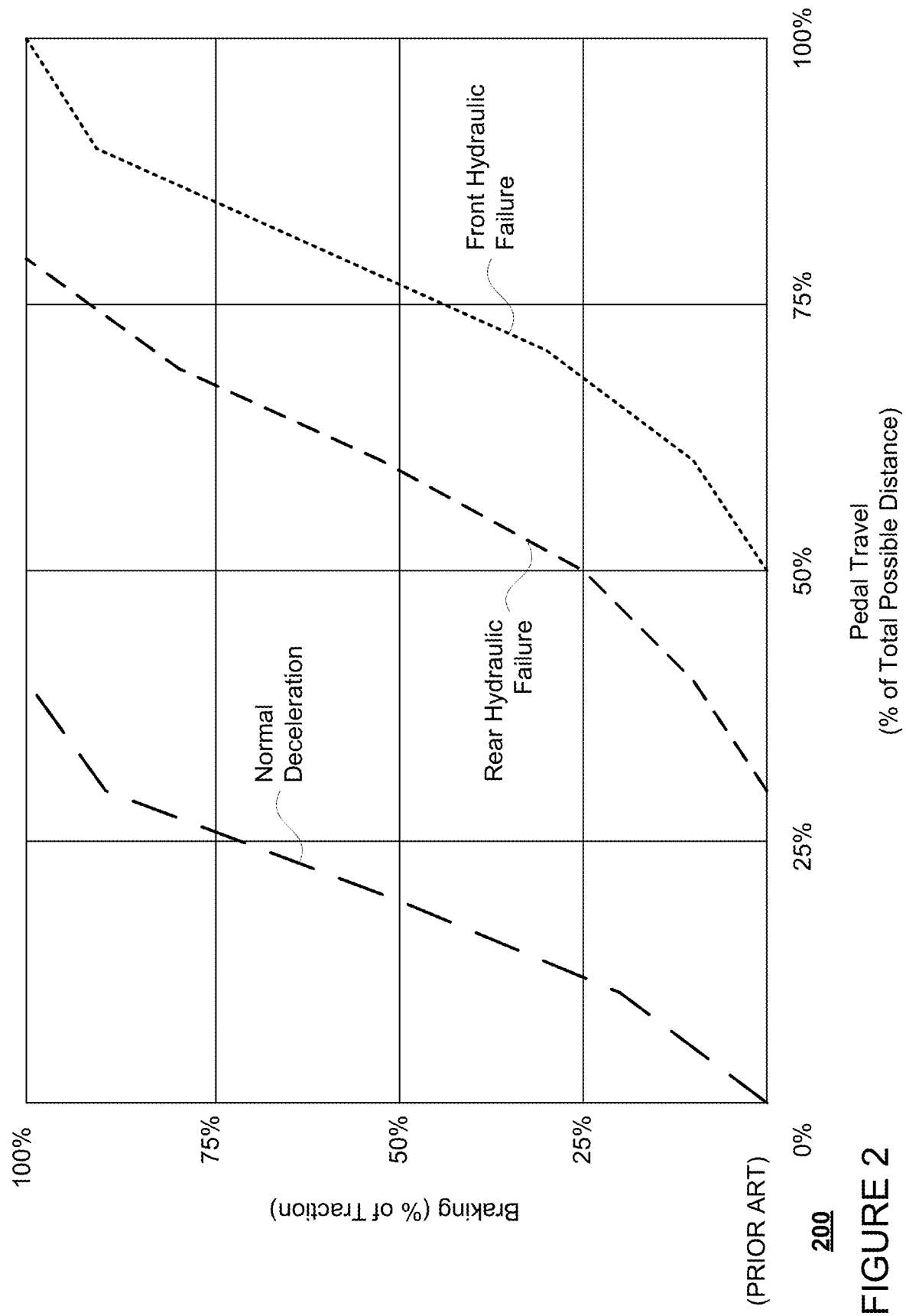
FIG. 2 is an example chart representing data in accordance with aspects of the disclosure.

For instance, if there is a total lack of pressure in the first piston chamber, the braking would be zero until the first piston causes the second piston to be contacted as indicated by the front hydraulic failure curve depicted in FIG. 2. As this requires moving the brake pedal some distance, the autonomous vehicle's computing devices may not be able to properly control the braking of the vehicle using its typical braking control behaviors.

Moreover, in some vehicle designs, the vehicle's brake pressure management system may shut down in the presence of a major hydraulic leak, due to detected inconsistencies. The backup braking system for the autonomous vehicle may only be able to control the brake pedal position; in this situation, the relationship between brake pedal position and deceleration would be unknown to the vehicle's computing devices, and in many cases moderate brake pedal positions may lead to almost no braking due to the design of the hydraulic system.

In order to address such situations, the vehicle's computing devices must be able to change from a first braking control behavior, based on the aforementioned linear relationship between brake pedal position and decoration amount, to a second braking control behavior in the event of a hydraulic system failure. This may include first determining that there is both significant under-braking as well as that the vehicle is in a brake pedal only control mode. The vehicle's computing devices may determine that the vehicle is in a brake pedal only control mode based on feedback from or a total lack of feedback from the vehicle's braking safety systems.

The combination of significant under-braking and a brake pedal only control mode may cause the vehicle's computing devices to change its braking behaviors from the first braking control behavior to the second braking control behavior. In one example, the vehicle's computing devices may attempt to achieve as much braking as possible by simply moving the brake pedal as far and as quickly as possible. As another example, the vehicle's computing devices may begin to manage brake pedal position based on observed deceleration and observed wheel slip. If the vehicle is not decelerating enough and not skidding, brake pedal position may be increased. If the vehicle is decelerating as much as desired or wheel skid is detected, brake pedal position may be decreased. When no slippage is detected, but the preferred deceleration amount has not been reached, the computing devices may resume the increase in the brake pedal position. In this regard, the computing devices may also decrease the brake pedal position if the computing devices are observing the desired deceleration.

The vehicle's computing devices may also take into account other factors such as additional system failures and adjust behavior appropriately. The vehicle's computing devices may control the vehicle to stop as soon as possible or may simply continue to maneuver the vehicle until it reaches a destination.

The features described herein allow a vehicle's computing devices to change the braking behavior of a vehicle in the event of a hydraulic system failure. Not only are the vehicle's computing devices able to detect a hydraulic failure, but also to respond to one by brake pedal control while still attempting to avoid locking up the vehicle's wheels and preventing uncontrollable skidding. And all this can be achieved without the vehicle's computing devices having to determine which circuit has failed or what type of failure (total loss of pressure or slow leak). In addition, as noted above, the aforementioned braking behaviors may allow the vehicle's computing devices to safely decelerate the vehicle even in situations when the relationship between brake pedal position and deceleration varies over time, such as in the event of a slow leak of a hydraulic circuit.

Example Systems

Figure 3:
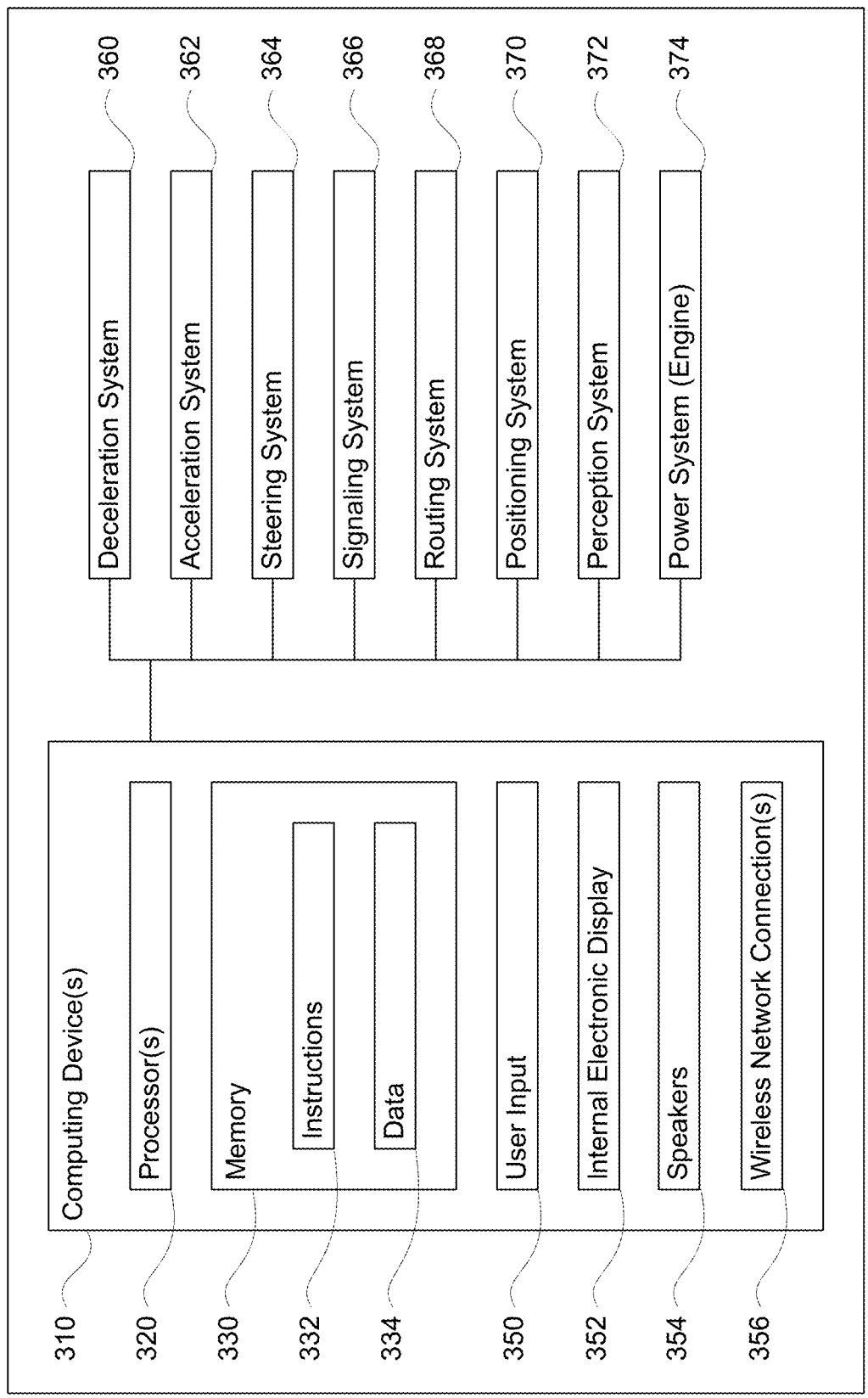
FIG. 3 is a functional diagram of an example vehicle in accordance with aspects of the disclosure.

As shown in FIG. 3, a vehicle 300 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing devices 310 containing one or more processors 320, memory 330 and other components typically present in general purpose computing devices.

The memory 330 stores information accessible by the one or more processors 320, including instructions 334 and data 332 that may be executed or otherwise used by the processor 320. The memory 330 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 334 may be any set of instructions to be executed directly (such as machine code) or indirectly (such as scripts) by the processor. For example, the instructions may be stored as computing device code on the computing device-readable medium. In that regard, the terms "software," "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 332 may be retrieved, stored or modified by processor 320 in accordance with the instructions 334. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 320 may be any conventional processors, such as commercially available CPUs. Alternatively, the one or more processors may be a dedicated device such as an ASIC or other hardware-based processor. Although FIG. 3 functionally illustrates the processor, memory, and other elements of computing devices 310 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 310. Accordingly, references to a processor or computing device will be understood to include references to a collection of processors or computing devices or memories that may or may not operate in parallel.

Computing devices 310 may all of the components normally used in connection with a computing device such as the processor and memory described above as well as a user input 350 (e.g., a mouse, keyboard, touch screen and/or microphone) and various electronic displays (e.g., a monitor having a screen or any other electrical device that is operable to display information). In this example, the vehicle includes an internal electronic display 352 as well as one or more speakers 354 to provide information or audio visual experiences. In this regard, internal electronic display 352 may be located within a cabin of vehicle 300 and may be used by computing devices 310 to provide information to passengers within the vehicle 300.

Computing devices 310 may also include one or more wireless network connections 356 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing devices 310 may be control computing devices of an autonomous driving computing system or incorporated into vehicle 300. The autonomous driving computing system may capable of communicating with various components of the vehicle in order to control the movement of vehicle 300 according to the autonomous control software of memory 330 as discussed further below. For example, as shown in FIG. 3, computing devices 310 may be in communication with various systems of vehicle 300, such as deceleration system 360, acceleration system 362, steering system 364, signaling system 366, routing system 368, positioning system 370, perception system 372, and power system 374 (i.e. the vehicle's engine or motor) in order to control the movement, speed, etc. of vehicle 300 in accordance with the instructions 334 of memory 330. For instance, the memory may store steering, acceleration and deceleration profiles and limits for the vehicle which can be used to determine how to control the various systems of the vehicle. Again, although these systems are shown as external to computing devices 310, in actuality, these systems may also be incorporated into computing devices 310, again as an autonomous driving computing system for controlling vehicle 300.

Figure 1:
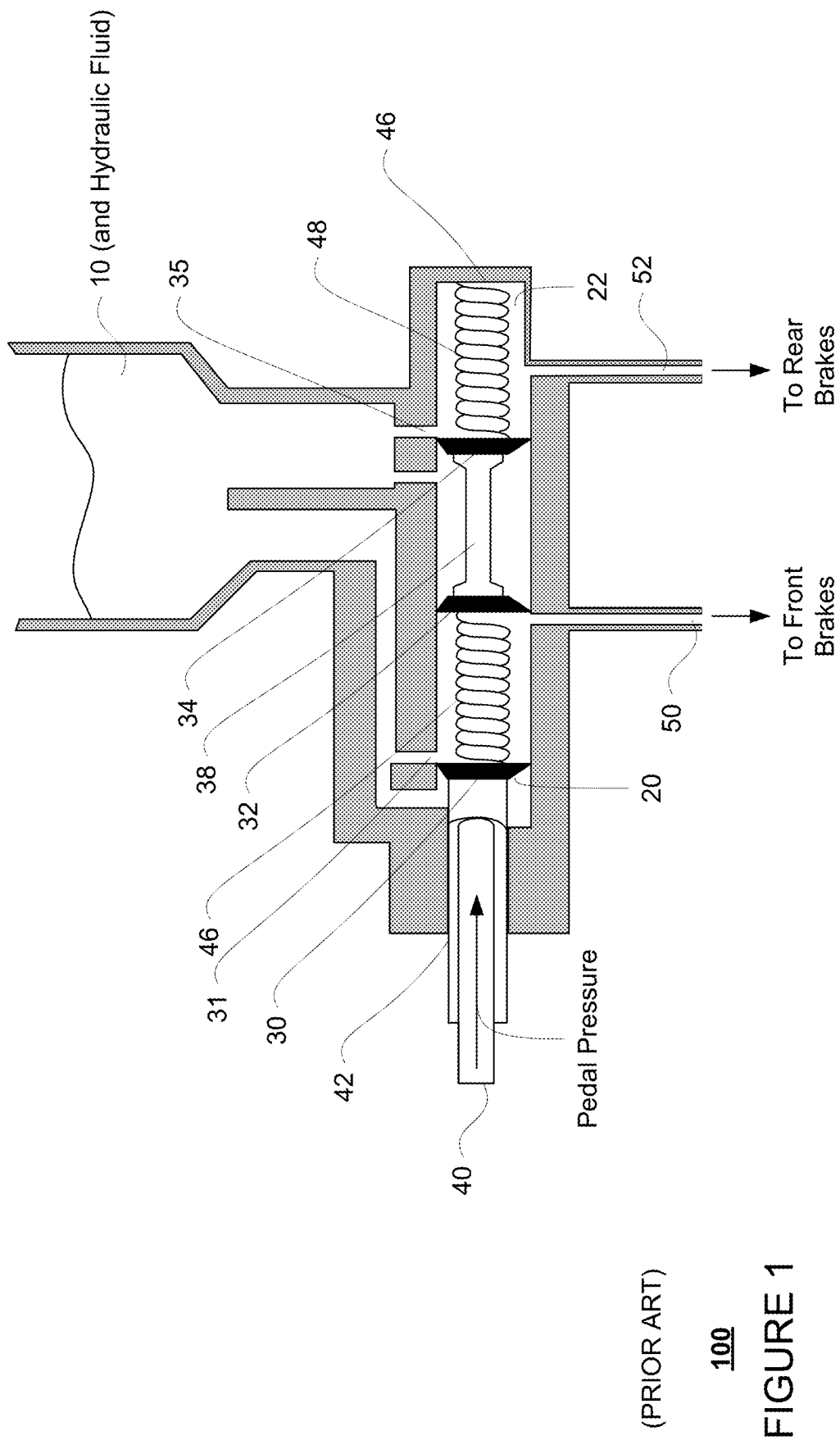
FIG. 1 is an example of a hydraulic brake system in accordance with the prior art.
Figure 4:
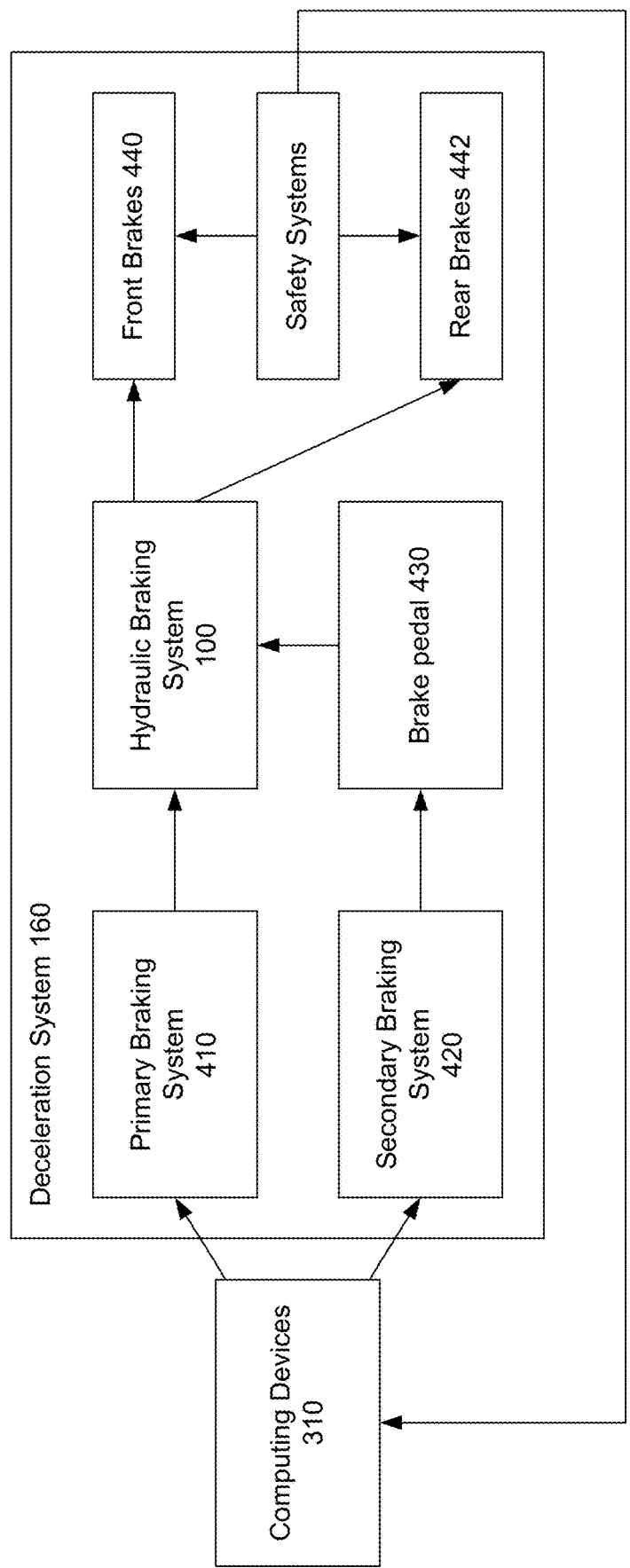
FIG. 4 is a functional diagram of a deceleration system in accordance with aspects of the disclosure.

As an example, computing devices 310 may interact with one or more actuators of the deceleration system 360 and/or acceleration system 362, such as brakes, accelerator pedal, and/or the engine or motor of the vehicle, in order to control the speed of the vehicle. FIG. 4 depicts an example functional diagram of deceleration system 360 where the arrow represent the flow of commands and/or physical relationships. In this example, deceleration system 360 may include a primary braking system 410 which may function as a pressure management system in order to control hydraulic pressure of the vehicle's hydraulic braking system 100 (see FIG. 1). The primary braking system 410 may include various features and computing devices configured to adjust the hydraulic pressure of the hydraulic circuits in order to control front and rear brakes 440, 442 and thereby, deceleration of vehicle 300 according to commands from the computing devices 310. The deceleration system 360 may also include a backup or secondary braking system 420 that may only be able to control the position of the brake pedal 430 in order to control the front and/or rear brakes 440, 442 (depending upon a type of failure in the hydraulic braking system 100). For instance, the secondary braking system 420 may include one or more motors configured to change the position of the brake pedal 430 in accordance with commands from the computing devices 310. The deceleration system 360 may also include additional safety systems 450 including, for instance, antilock braking systems (ABSs) and/or electronic stability control (ESC) systems configured to provide feedback to the computing devices 310.

The computing devices 310 may be configured to control the primary braking system via software and data of the memory 330 according to a first braking control behavior based on a first relationship between brake pedal position and decoration amount, for instance, corresponding to the normal deceleration curve of FIG. 2. This may include, for instance, at least in part, a linear relationship between deceleration and brake pedal position. In the event of a hydraulic system failure, the computing devices 310 may be configured to control the secondary braking system 420 via software and data of the memory 330 according to a second braking control behavior which defines a deceleration target as well as predetermined rates for moving the brake pedal based on upon the circumstances of the vehicle's deceleration as discussed further below.

Similarly, one or more actuators of the steering system 364, such as a steering wheel, steering shaft, and/or pinion and rack in a rack and pinion system, may be used by computing devices 310 in order to control the direction of vehicle 300. For example, if vehicle 300 is configured for use on a road, such as a car or truck, the steering system may include one or more actuators to control the angle of wheels to turn the vehicle. Signaling system 366 may be used by computing devices 310 in order to signal the vehicle's intent to other drivers or vehicles, for example, by lighting turn signals or brake lights when needed.

Routing system 368 may be used by computing devices 310 in order to determine and follow a route to a location. In this regard, the routing system 368 and/or data 332 may store detailed map information, e.g., highly detailed maps identifying the shape and elevation of roadways, lane lines, intersections, crosswalks, speed limits, traffic signals, buildings, signs, real time traffic information, vegetation, or other such objects and information. For example, the map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 370 may be used by computing devices 310 in order to determine the vehicle's relative or absolute position on a map or on the earth. For example, the position system 370 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 370 may also include other devices in communication with computing devices 310 in order to allow the computing devices 310 to determine the direction and speed of the vehicle or changes thereto. For instance positioning system 370 may also include gyroscopes, accelerometers, inertial measurement units (IMUs), and wheel speed sensors which provide feedback to the vehicle's computing devices about the vehicle's position and acceleration changes. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing devices 310, other computing devices and combinations of the foregoing.

Figure 5:
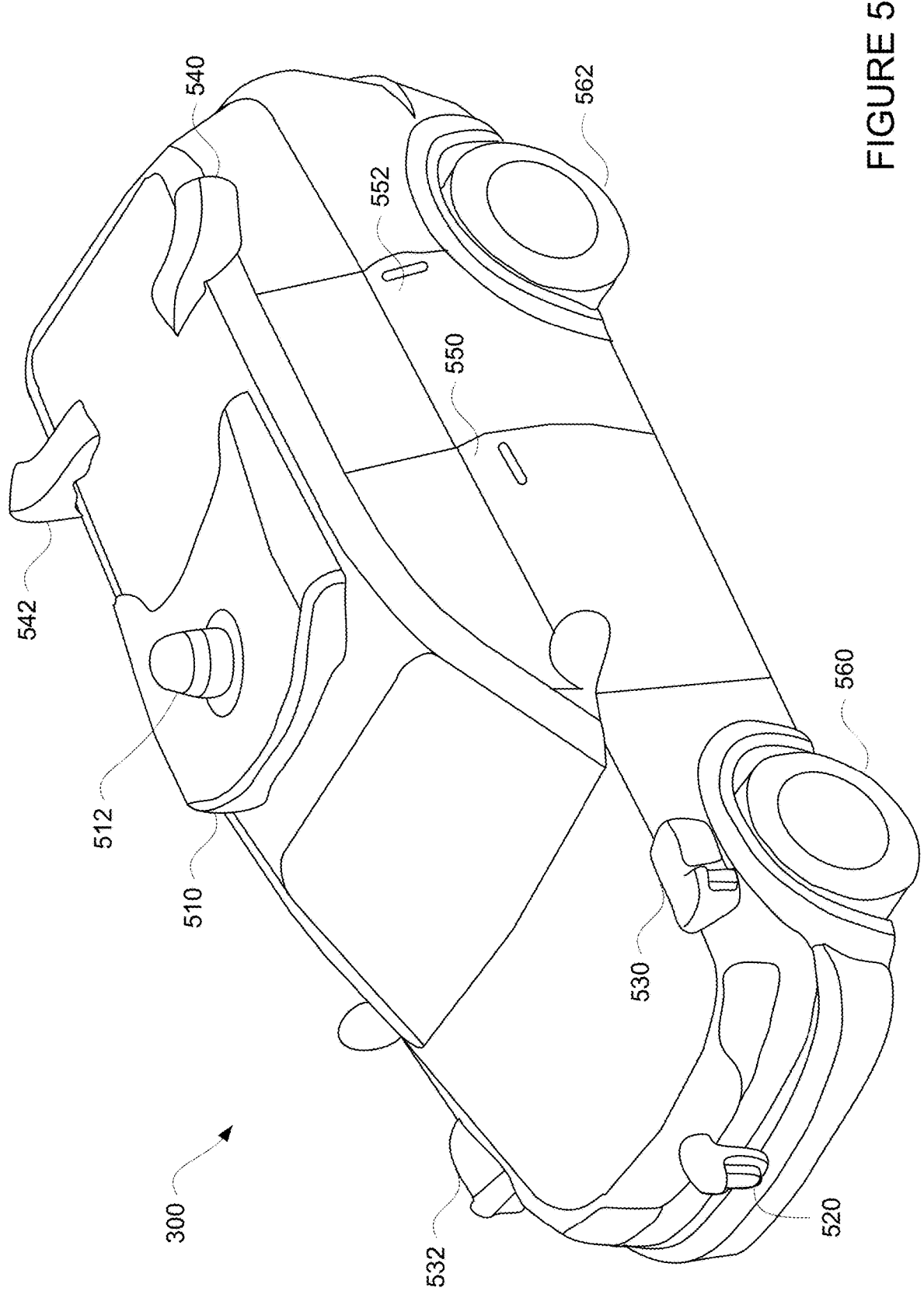
FIG. 5 is an example external view of a vehicle in accordance with aspects of the disclosure.

The perception system 372 also includes one or more components for detecting objects external to the vehicle such as other vehicles, obstacles in the roadway, traffic signals, signs, trees, etc. For example, the perception system 372 may include lasers, sonar, radar, cameras and/or any other detection devices that record data which may be processed by computing device2 310. In the case where the vehicle is a passenger vehicle such as a minivan, the minivan may include a laser or other sensors mounted on the roof or other convenient location. For instance, FIG. 5 is an example external view of vehicle 300. In this example, roof-top housing 510 and dome housing 512 may include a LIDAR sensor as well as various cameras and radar units. In addition, housing 520 located at the front end of vehicle 300 and housings 530, 532 on the driver's and passenger's sides of the vehicle may each store a LIDAR sensor. For example, housing 530 is located in front of driver door 550. Vehicle 300 also includes housings 540, 542 for radar units and/or cameras also located on the roof of vehicle 300. Additional radar units and cameras (not shown) may be located at the front and rear ends of vehicle 300 and/or on other positions along the roof or roof-top housing 510. Vehicle 300 also includes many features of a typical passenger vehicle such as doors 550, 552, wheels 560, 562, etc.

The computing devices 310 may control the direction and speed of the vehicle by controlling various components. By way of example, computing devices 310 may navigate the vehicle to a destination location completely autonomously using data from the detailed map information and a route determined by the routing system 368. Computing devices 310 may use the positioning system 370 to determine the vehicle's location and perception system 372 to detect and respond to objects when needed to reach the location safely. For instance, the computing devices may generate trajectories defining geometries, speeds, accelerations, decelerations, etc. which cause the vehicle to follow the route.

In order to do so, computing devices 310 may generate and send commands to cause the vehicle to accelerate (e.g., by increasing fuel or other energy provided to the engine by acceleration system 362), decelerate (e.g., by decreasing the fuel supplied to the engine, changing gears, and/or by applying brakes by deceleration system 360), change direction (e.g., by turning the front or rear wheels of vehicle 300 by steering system 364), and signal such changes (e.g., by lighting turn signals of signaling system 366) in accordance with the trajectories. Thus, the acceleration system 362 and deceleration system 360 may be a part of a drivetrain that includes various components between an engine of the vehicle and the wheels of the vehicle. Again, by controlling these systems, computing devices 310 may also control the drivetrain of the vehicle in order to maneuver the vehicle autonomously.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

During normal operation, where the deceleration system is functioning formally, the computing devices 410 may send commands to the primary braking system 410 to control the operation of the deceleration system. In the presence of a major hydraulic leak, due to detected inconsistencies, the primary braking system 410 may shut down. The secondary braking system 420 would be required to take over and control the deceleration system 160 in the brake pedal only control mode.

This may include the computing devices 310 first determining that there is both significant under-braking (or rather, less deceleration than expected) as well as that the vehicle is in a brake pedal only control mode for deceleration. For instance, the computing devices 310 may generate speed control commands which are used to control the deceleration system 360 in order to cause the vehicle to follow a certain trajectory. The computing devices 310 may receive feedback from the accelerometers, IMUs, and wheel speed sensors. The vehicle's computing devices may use this feedback to determine whether the vehicle is braking according to its current trajectory and/or the braking commands sent to the braking system. In this regard, the computing devices 310 may compare the expected deceleration from the trajectory and/or braking commands to the actual deceleration of the vehicle as determined from the feedback. In addition or alternatively, the computing devices may compare the expected position from the vehicle's trajectory according to the commands to the actual position of the vehicle.

Figure 6:
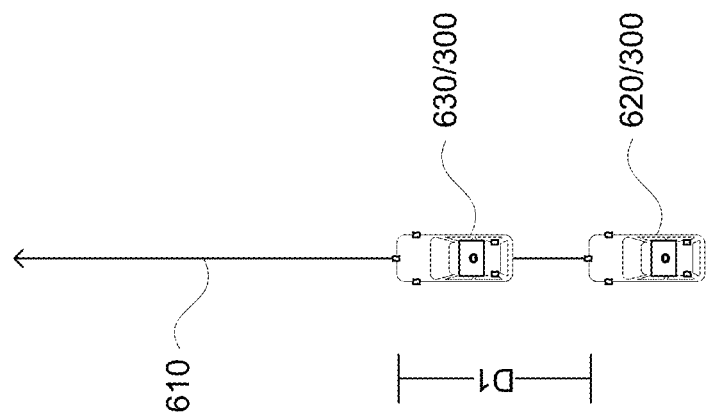
FIG. 6 is an example diagram of vehicle positions and a trajectory in accordance with aspects of the disclosure.

For instance, FIG. 6 depicts an example 600 of a current trajectory 610 for vehicle 300. In this example, the vehicle 300 is shown in a first position 620 corresponding to an expected position of the vehicle given an expected deceleration and a second position 630 corresponding to an actual position of the vehicle given an actual deceleration. The difference between these two positions is depicted by distance D1. Slight differences in position related to deceleration may be caused by changes in road surface friction and/or elevation. However, if this difference is significant, for instance at least some predetermined threshold such as is 0.5 meters or more or less ahead or in front of where the vehicle should be given the braking commands and/or the trajectory, the vehicle's computing device may determine that there is significant under-braking. In other words, if the distance D1 is greater than 0.5 meters, this may indicate significant under-braking.

The vehicle's computing devices may determine that the vehicle's deceleration system 360 is in a brake pedal only control mode based on feedback from or a total lack of feedback from the vehicle's additional safety systems 450, such as ABS or ESC systems. For instance, an ABS system may report a failure immediately before shutting down. The vehicle's computing devices may determine that the vehicle is in a brake pedal only control mode based on this feedback.

The combination of significant under-braking and a brake pedal only control mode of the deceleration system 360 may cause the computing devices 310 to change braking behaviors from the first braking control behavior to the secondary braking control behavior. In one example, the vehicle's computing devices may attempt to achieve as much braking as possible by using the secondary braking system 420 to move the brake pedal 430 as far towards the maximum position or maximum depression level and as quickly as possible. However, doing so may cause the vehicle to lose braking and steering control due to skidding of the vehicle's wheels. For instance, if the vehicle's computing devices were to simply push on the brake pedal 430 as hard as possible in the absence of the ABS, the vehicle would be at risk of locking of the brakes and skidding uncontrollably rather than slowing down.

To avoid this, the computing devices 310 may begin to manage brake pedal position based on observed deceleration and observed wheel slip (based on the wheel speed sensors). If the vehicle is not decelerating according to a deceleration target and not skidding, brake pedal position is increased towards the maximum position or maximum depression level. If the vehicle is decelerating as much as desired (i.e. the vehicle is meeting the deceleration target) or wheel skid is detected, brake pedal position is decreased away from the maximum position or maximum depression level. For instance, the brake pedal position may be increased according to a first predetermined rate in a continuous and linear rate. For instance, the position of the brake pedal may be moved from 0 to 100% of the maximum position or maximum depression level over 2 seconds (50% of the total brake pedal distance/second) in order to reach a deceleration target such as 5 meters per second squared.

If there is feedback indicating wheel slippage, the computing devices 310 may decrease the position, again at a second predetermined rate that is a continuous and linear rate. This second predetermined rate may be is twice as fast as the absolute value of the first predetermined rate for the increase or rather, a decrease of 100% of the maximum position or maximum depression level per second. When no slippage is detected, but the deceleration target has not been reached, the computing devices may resume the increase in the brake pedal position towards the maximum position or maximum depression level at the first predetermined rate or a slightly slower rate. In this regard, the computing devices may also decrease the brake pedal position away from the maximum position or maximum depression level if the computing devices are observing the deceleration target. This second braking control behavior may allow the vehicle's computing devices to safely decelerate the vehicle even in situations when the relationship between brake pedal position and deceleration varies over time, such as in the event of a slow leak of a hydraulic circuit.

Figure 7:
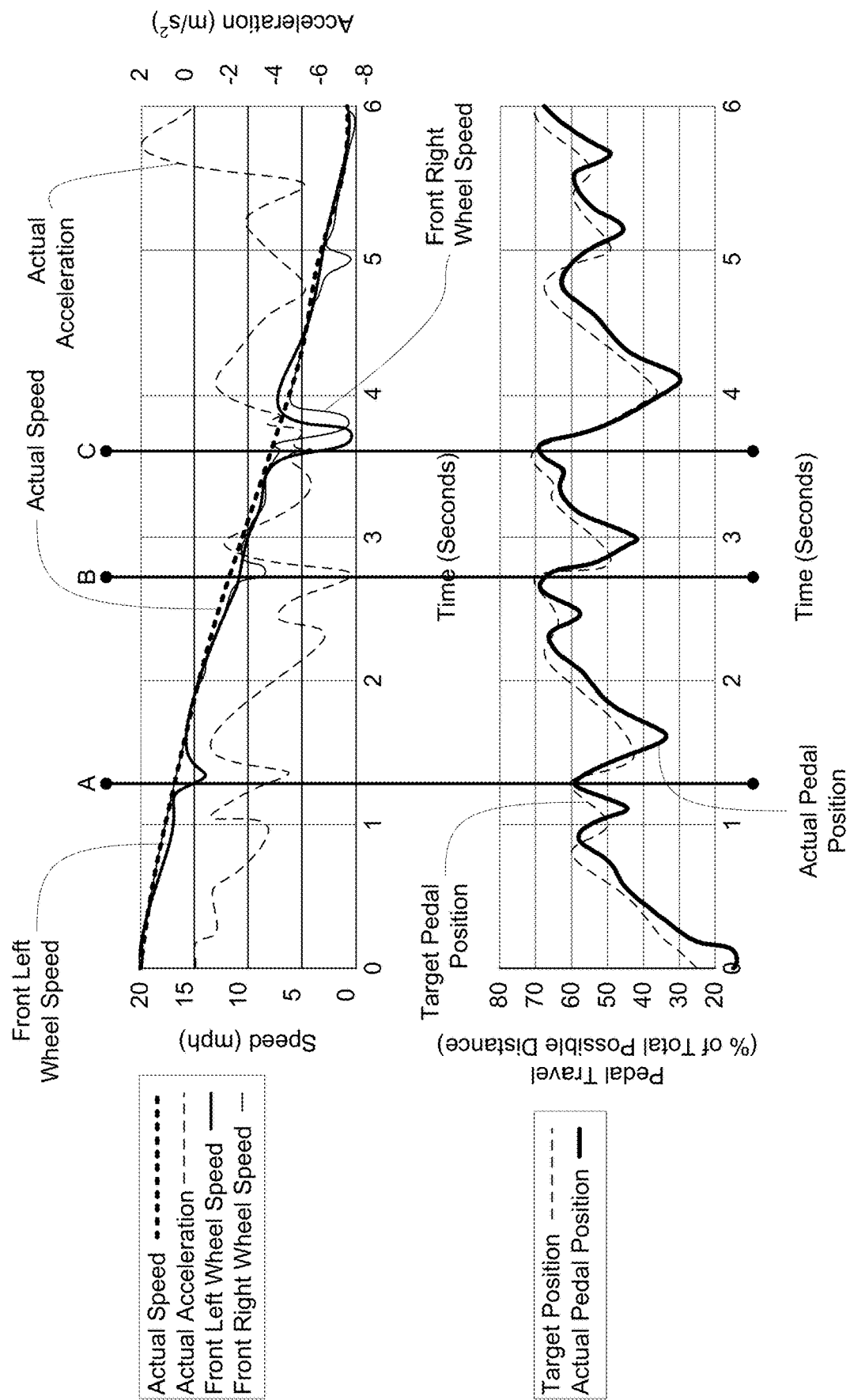
FIG. 7 is an example graph approximation of a simulation of braking behaviors in accordance with aspects of the disclosure.

FIG. 7 provides an example graph approximation of a simulation these behaviors over a 6 second period of time as a vehicle slows down from approximately 20 miles per hour to zero miles per hour with a complete failure of the hydraulic system affecting the rear brakes of a vehicle. In this example, target pedal position represents the relative position of a brake pedal as would be indicated by commands from computing devices 310, and the actual pedal position represents an actual position of the brake pedal as indicated by feedback from the secondary braking system 420. Actual speed represents an actual speed of the vehicle, actual acceleration represents an actual acceleration of the vehicle (negative values representing deceleration), and front left and front right wheel speeds represent the speeds of each of the vehicle's front left and front right wheel speed. In this example, the actual pedal position generally lags slightly behind the target pedal position. In addition, as can be seen by instances A, B, and C where the left and right wheel speeds fall off relative to the actual speed of the vehicle, this indicates that these wheels are slipping, for instance as determined by the computing devices 310 from the aforementioned wheel speed sensors. As such, the target pedal position is immediately adjusted backwards or reduced to a lower percentage or amount of deceleration in order to compensate and regain control. Again, immediately thereafter, when there is no wheel slippage, the target pedal position is again increased. This process continues until the vehicle's speed goes to 0 and the vehicle is stopped.

The computing devices 310 may also take into account other factors such as additional system failures, such as loss of the wheel speed sensors used to detect skidding, and adjust behavior appropriately. For instance, a failure or loss of one or more of the wheel speed sensors may be determined when such sensors are sending error messages or are no longer sending feedback to the computing devices 310. In such situations, the computing devices may automatically reduce the deceleration target, for instance from 5 meters per second squared to 4 meters per second squared. Even lower deceleration targets may be used to further reduce the likelihood of wheel slippage and skidding; however, there is a trade-off between stopping distance and stability.

The computing devices may control the vehicle to stop as soon as possible or may simply continue to maneuver the vehicle until it reaches a predetermined destination. This predetermined destination may be a destination the vehicle is attempting to reach on a current trip, or some other location, such as a parking spot or other location safe for the vehicle to stop and wait for assistance. This determination may be based on a risk assessment, for instance, which balances the safety of passengers if the vehicle stops at its current location (i.e. is the vehicle going to stop on railroad tracks) with the distance to the destination, etc.

Figure 8:
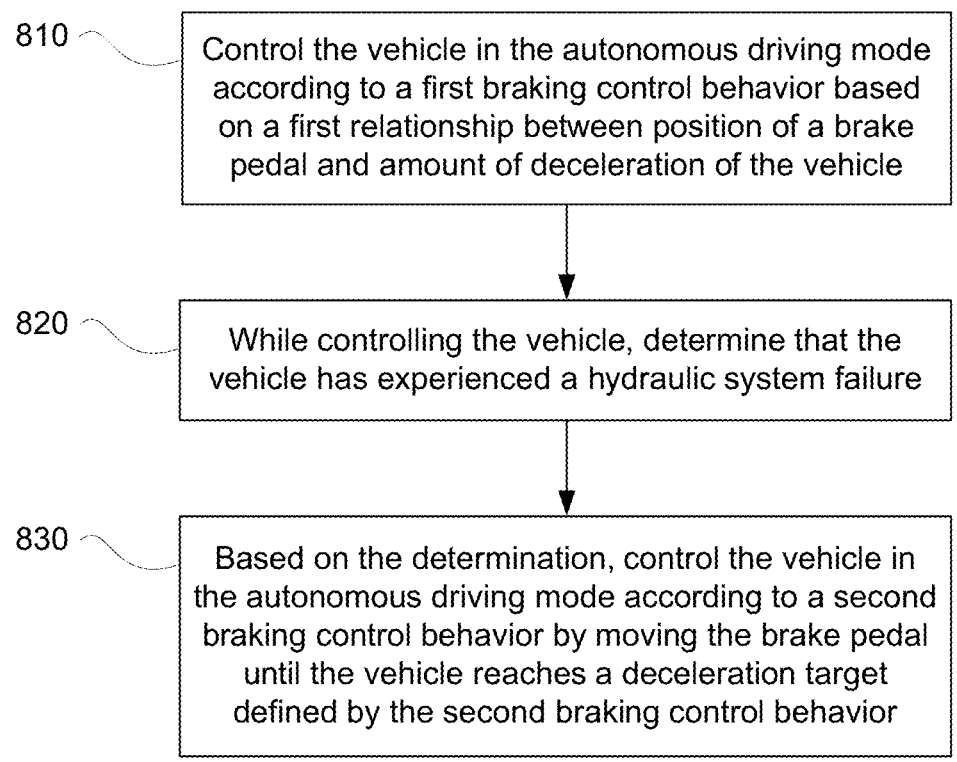
FIG. 8 is an example flow diagram in accordance with aspects of the disclosure.

FIG. 8 includes an example flow diagram 800 of some of the examples for controlling braking behaviors of a vehicle in an autonomous driving mode in response to a hydraulic system failure, which may be performed by one or more processors such as processors of computing devices 310. In this example, at block 810, the vehicle is controlled in the autonomous driving mode according to a first braking control behavior based on a first relationship between position of a brake pedal and amount of deceleration of the vehicle. At block 820, while controlling the vehicle, the vehicle is determined to have experienced a hydraulic system failure. This may include determining both that a difference between the vehicle's expected and actual deceleration meets a threshold value and that a deceleration system of the vehicle is in a brake pedal only control mode. In addition, determining that the deceleration system of the vehicle is in a brake pedal only control mode is based on an error message from an ABS or ESC system of the vehicle indicating that the ABS and/or ESC system is or will shut down. At block 830, based on the determination, the vehicle is controlled in the autonomous driving mode according to a second braking control behavior by moving the brake pedal until the vehicle reaches a deceleration target defined by the second braking control behavior.

The features described herein allow a vehicle's computing devices to change the braking behavior of a vehicle in the event of a hydraulic system failure. Not only are the vehicle's computing devices able to detect a hydraulic failure, but also to respond to one by pedal control while still attempting to avoid locking up the vehicle's wheels and preventing uncontrollable skidding. And all this can be achieved without the vehicle's computing devices having to determine which circuit has failed or what type of failure (total loss of pressure or slow leak). In addition, as noted above, the aforementioned braking behaviors may allow the vehicle's computing devices to safely decelerate the vehicle even in situations when the relationship between brake pedal position and deceleration varies over time, such as in the event of a slow leak of a hydraulic circuit.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of controlling braking behaviors of a vehicle in an autonomous driving mode in response to a hydraulic system failure, the method comprising:
   controlling, by one or more processors, the vehicle in the autonomous driving mode according to a first braking control behavior based on a first relationship between position of a brake pedal and amount of deceleration of the vehicle;
   while controlling the vehicle, determining, by the one or more processors, that the vehicle has experienced a hydraulic system failure; and
   based on the determination, controlling, by the one or more processors, the vehicle in the autonomous driving mode according to a second braking control behavior by moving the brake pedal until the vehicle reaches a deceleration target defined by the second braking control behavior.

2. The method of claim 1, wherein determining that the vehicle has experienced a hydraulic system failure includes determining both that the a difference between the vehicle's expected and actual deceleration meets a threshold value and that a deceleration system of the vehicle is in a brake pedal only control mode.

3. The method of claim 2, wherein determining that the deceleration system of the vehicle is in a brake pedal only control mode is based on an error message from an ABS of the vehicle indicating that the ABS is or will shut down.

4. The method of claim 2, wherein determining that the deceleration system of the vehicle is in a brake pedal only control mode is based on an error message from an electronic stability control (ESC) system of the vehicle indicating that the ESC system is or will shut down.

5. The method of claim 1, wherein determining that the difference meets a threshold value is based on a current trajectory for the vehicle and a location of the vehicle relative to that trajectory.

6. The method of claim 1, wherein the second braking control behavior includes moving the brake pedal at a first predetermined rate.

7. The method of claim 6, further comprising:
while moving the brake pedal at the first predetermined rate, determining that a wheel of the vehicle is slipping; and
based on the determination that the wheel is slipping, adjusting the first predetermined rate to a second predetermined rate.

8. The method of claim 7, further comprising
after adjusting the first predetermined rate to the second predetermined rate, determining that the wheel of the vehicle is no longer slipping; and
based on the determination that the wheel is no longer slipping, adjusting the second predetermined rate to the first predetermined rate until the deceleration target is reached.

9. The method of claim 7, wherein the first predetermined rate includes increasing the position of the brake pedal towards a maximum depression level, and the second predetermined rate include decreasing of the brake pedal away from the maximum depression level.

10. The method of claim 7, wherein an absolute value of the first predetermined rate is at least twice as fast as an absolute value of the second predetermined rate.

11. The method of claim 7, wherein an absolute value of the second predetermined rate is at least half as fast as an absolute value of the first predetermined rate.

12. The method of claim 7, wherein determining that the wheel is slipping is based on feedback from a wheel speed sensor of the wheel.

13. The method of claim 1, further comprising:
determining that a wheel speed sensor of a wheel of the vehicle has failed; and
based on the determination that the wheel speed sensor of the wheel has failed, reducing the deceleration target to a lower amount of deceleration.

14. The method of claim 1, wherein controlling the vehicle in the autonomous driving mode according to the second braking control behavior includes stopping the vehicle.

15. The method of claim 1, wherein controlling the vehicle in the autonomous driving mode according to the second braking control behavior includes stopping the vehicle once a destination of a passenger is reached.

16. The method of claim 1, wherein the hydraulic system failure corresponds to a leaking of hydraulic fluid over time.

17. The method of claim 1, wherein the hydraulic system failure corresponds to a total loss of hydraulic pressure.

18. A system for controlling braking behaviors of a vehicle in an autonomous driving mode in response to a hydraulic system failure, the system comprising one or more processor configured to:
control the vehicle in the autonomous driving mode according to a first braking control behavior based on a first relationship between position of a brake pedal and amount of deceleration of the vehicle;
while controlling the vehicle, determine that the vehicle has experienced a hydraulic system failure; and
based on the determination, control the vehicle in the autonomous driving mode according to a second braking control behavior by moving the brake pedal until the vehicle reaches a deceleration target defined by the second braking control behavior.

19. The system of claim 18, wherein the one or more processors are configured to determine that the vehicle has experienced a hydraulic system failure by determining both that a difference between the vehicle's expected deceleration and actual deceleration meets a threshold value and that a deceleration system of the vehicle is in a brake pedal only control mode.

20. The system of claim 18, further comprising the vehicle.

* * * * *

UNITED STATES PATENT AND TRADEMARK OFFICE
CERTIFICATE OF CORRECTION

PATENT NO. : 10,710,565 B2
APPLICATION NO. : 16/156441
DATED : July 14, 2020
INVENTOR(S) : Daniel Trawick Egnor et al.

It is certified that error appears in the above-identified patent and that said Letters Patent is hereby corrected as shown below:

In the Claims

Claim 2, Column 12, Line 67:
Now reads "the a difference"; should read -- a difference --

Claim 5, Column 13, Line 13:
Now reads "The method of claim 1,"; should read -- The method of claim 2, --

Signed and Sealed this
Twenty-ninth Day of December, 2020

Andrei Iancu
*Director of the United States Patent and Trademark Office*